3,526,110
TRAILER COUPLER COVER LOCK
Daniel J. Foote, Wauwatosa, Wis., assignor to Master Lock Company, Milwaukee, Wis., a corporation of Wisconsin
Filed Nov. 21, 1968, Ser. No. 777,617
Int. Cl. E05b 65/12
U.S. Cl. 70—258                    15 Claims

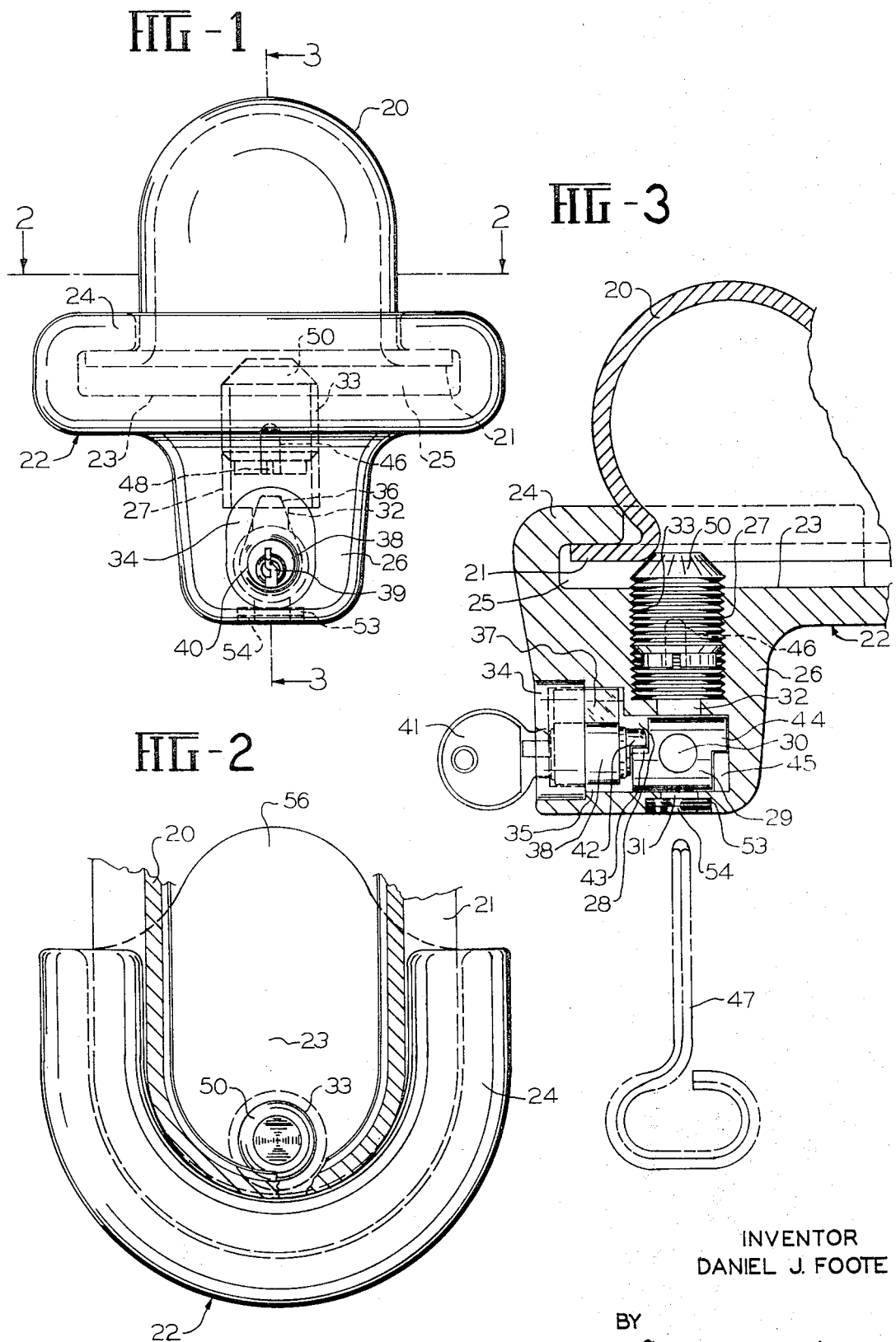

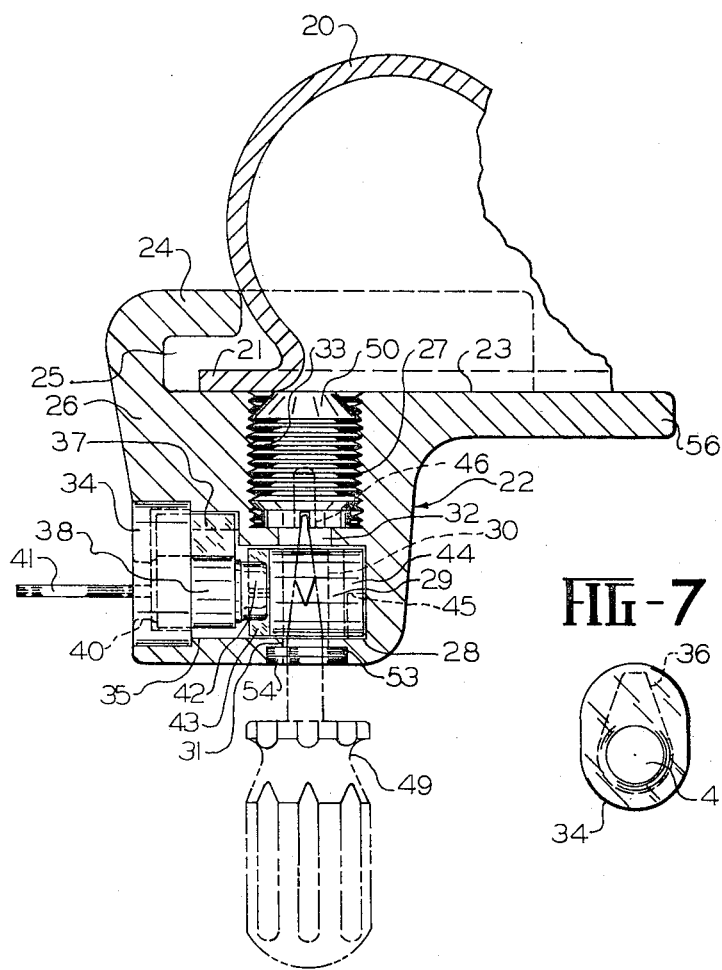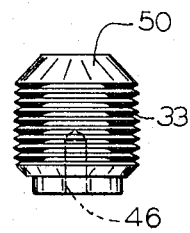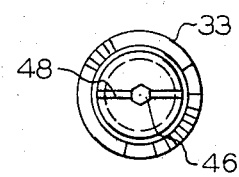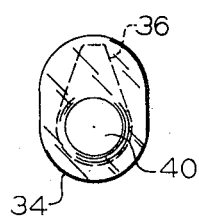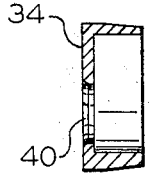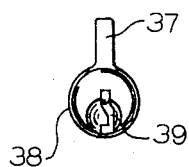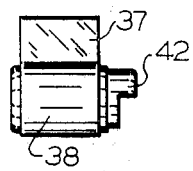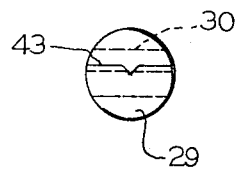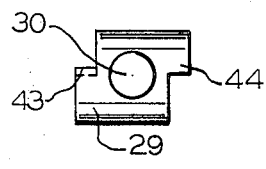
INVENTOR
DANIEL J. FOOTE
ATTORNEY Sept. 1, 1970     D. J. FOOTE     3,526,110
TRAILER COUPLER COVER LOCK
Filed Nov. 21, 1968     3 Sheets-Sheet 3
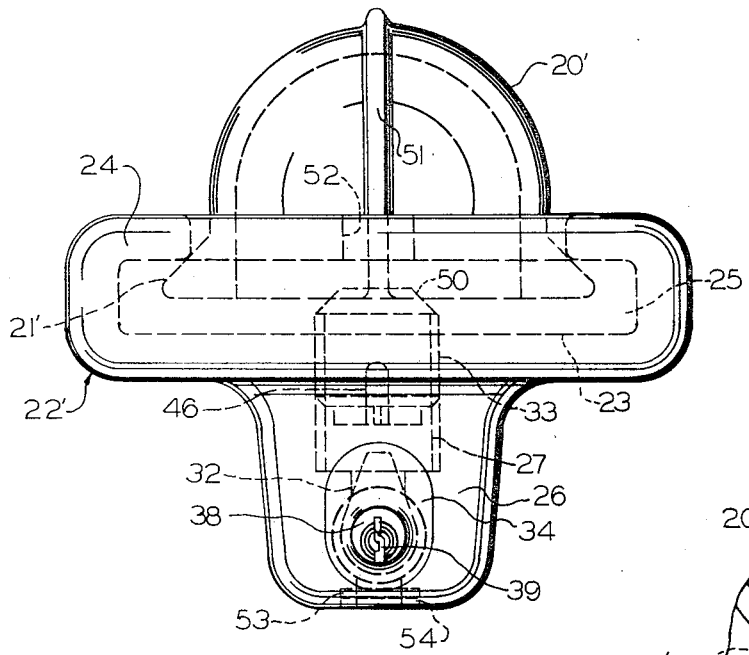
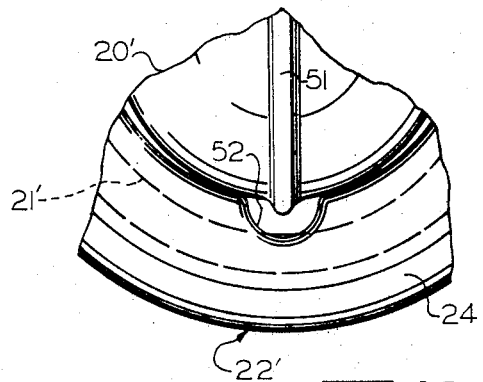
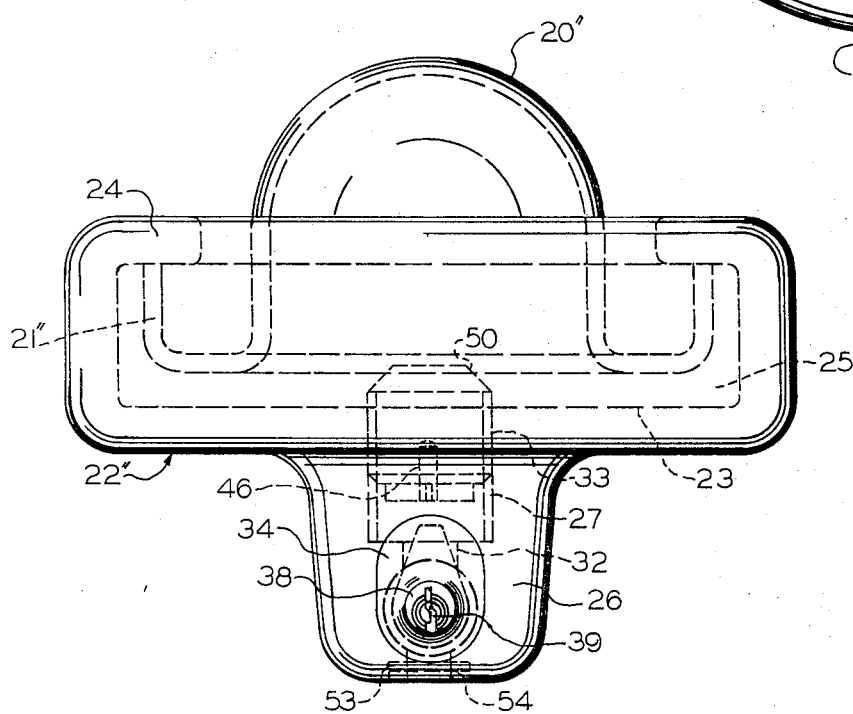
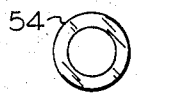
INVENTOR
DANIEL J. FOOTE
BY
ATTORNEY United States Patent Office 3,526,110
Patented Sept. 1, 1970

ABSTRACT OF THE DISCLOSURE

To prevent the unauthorized tow-away of a detached trailer, the entrance of a towing vehicle ball into the trailer hitch coupler socket is precluded by a lock-controlled, flanged cover plate closing the entrance to the coupler socket. The cover plate adjustably completely houses a set screw which, when adjusted, clamps a portion of a rim on the coupler socket against and under a portion of the cover plate flange. Also operatively mounted within the cover plate with only its key slot exposed is a non-removable cylinder lock which turns a housed plug extension having a transverse bore therein, registering in one turned position of the plug extension with alined openings in the cover plate whereby an externally applied tool may engage and operate the set screw, but in another turned position of the plug extension external insertion of a tool for set screw operation is prevented.

BACKGROUND OF THE INVENTION

Many devices have heretofore been proposed for preventing the unauthorized tow-away of a detached vehicular trailer while the owner is absent, but most of the prior proposals have been objectionable because they include exposed parts and locks which are vulnerable to breakage or deflection to an extent which will permit the insertion into the trailer hitch socket of a ball of an unauthorized towing vehicle. Pursuant to the present invention a cover plate is provided for the trailer hitch coupler socket entrance and said cover plate is formed with a horseshoe shaped inturned flange below which there is a shouldered recess or groove of substantial height to receive the lower peripheral rimmed portion of the hitch coupler socket, so that the parts can only be separated by relative sliding, followed by vertical movements. A set screw, completely housed within a body portion of the cover plate, may be adjusted to clampingly impinge a portion of the coupler socket rim against and under a portion of the cover plate flange. A body portion of the cover plate also turnably houses a cylinder lock having only its key slot accessible. When the lock is in one turned position certain registering openings accommodate an externally inserted tool for set screw adjustments. However, in another turned position of the lock the set screw is inaccessible.

The closest known approach to the structure of the instant invention is that disclosed in connection with FIG. 8 of the Longenecker U.S. Pat. No. 3,410,580 of Nov. 12, 1968. However, this prior art arrangement has substantial limitations as to sizes and styles of hitch coupler sockets with which the cover plate may be associated and it utilizes a padlock which must be completely removed from its socket in the plate body before tool access to the set screw is permitted, as opposed to applicant's turnable cylinder lock which always remains housed within its cover plate socket.

SUMMARY OF THE INVENTION

A general object of the invention is to provide a strong, steel trailer coupler cover lock applicable to the coupler sockets of trailers of various sizes to protect the trailers against unauthorized tow-away.

A more specific object of the invention is to provide in a trailer coupler cover lock of the character described, an unexposed, key controlled pin tumbler cylinder locking mechanism which affords maximum locking protection and which is, moreover, rap and shim proof and which will preclude attempts to unauthorizedly separate it from the trailer coupler to which it is applied.

A further object of the invention is to provide a trailer coupler cover lock which is operable by a simple key manipulation without the involvement of springs and levers, the cover plate of the assemblage having a projecting ledge to preclude access to the nut on the hitch whereby the latter may not be unauthorizedly unscrewed.

Still further objects of the invention are to provide a trailer coupler cover lock which is simple in design and construction, which may be easily applied to a trailer coupler socket, which is easy to manipulate, which completely protects the incorporated cylinder lock and is dust-proof, which is relatively inexpensive, and which effectively protects a detached trailer against surreptitious tow-away.

BRIEF DESCRIPTION OF THE DRAWINGS

FIG. 1 is a front view of the improved trailer coupler cover lock engaged with and locked to a typical trailer hitch coupler socket;

FIG. 2 is a fregmentary horizontal sectional view taken on line 2—2 of FIG. 1;

FIG. 3 is a fragmentary vertical sectional view taken on line 3—3 of FIG. 1 with a broken line showing of one form of tool which may be utilized for adjusting the set screw when the plug extension bore is in a certain position;

FIG. 4 is a vertical sectional view similar to FIG. 3 only showing the key-turned position of the lock cylinder and plug extension for registration of the bore in the latter with alined openings in the cover plate to provide tool access to the set screw;

FIG. 5 is a side view of the set screw;

FIG. 6 is a bottom view thereof;

FIG. 7 is a front view of the lock cylinder cover;

FIG. 8 is a vertical sectional view thereof;

FIG. 9 is a front view of the cylinder lock;

FIG. 10 is a side view thereof;

FIG. 11 is an end view of the cylinder lock plug extension;

FIG. 12 is a side view thereof;

FIG. 13 is a front view of a slightly modified form of trailer coupler cover plate and hitch coupler socket, the plate having a deeper groove below its inturned flange for the reception of the angled rim on another form of hitch coupler socket;

FIG. 14 is a fragmentary plan view of the cover plate and hitch coupler socket assemblage of FIG. 13;

FIG. 15 is a front view of a cover plate and hitch coupler socket assemblage wherein the depth or height of the groove below the inturned flange of the cover plate is still greater for the accommodation of a hitch coupler socket having a U-shaped rim;

FIG. 16 is a plan view of a rubber-like washer which may be lodged in the entrance to the tool access opening in the cover plate boss to prevent the entrance of dirt and foreign material; and FIG. 17 is a plan view of a metallic washer to underlie the washer of FIG. 16.

DESCRIPTION OF THE PREFERRED EMBODIMENTS

Referring first to FIGS. 1–4 inclusive of the drawings, the socket of a popular type of trailer hitch coupler is indicated by the numeral 20 and the entrance to the same is surrounded by an outwardly projecting horizontal rim 21.

Adapted for application to the open underside of said socket 20 in engagement with its rim 21 is a cover plate indicated generally by the numeral 22. The flat top portion 23 of said cover plate spacedly above the perimeter of its curved front end and side portions is surrounded by an integral U-shaped flange of horse shoe contour whose inturned top 24 is vertically spaced from the top surface of the top portion 23 to provide a groove 25 of substantial height for the accommodation of hitch coupler socket rims 21 of various thicknesses. As is best shown in FIG. 2 the rear of the cover plate top portion 23 is formed as a protruding ledge to underlie portions of the hitch coupler socket assembly from which might depend securing bolts and nuts or the like (not shown) to prevent undesired access to the same. An integral boss or body 26 depends from the front or outer end portion of the cover plate 22 and the same is formed with a vertical internally threaded bore 27 which opens at its upper end through the plate top portion 23 adjacent a portion of flange top 24. In the lower portion of the body 26, opening through the front or outer end thereof, is a cavity of eccentric shape, but whose axis is at right angles to the axis of the bore 27. The inner portion of said cavity is cylindrical, as at 28, to turnably house a plug extension 29 formed with a bore 30 therethrough transverse to its axis but registrable with alined openings 31 and 32 in side wall portions of that portion of the body 26 which contains the cylindrical opening 28 for the plug extension 29. The opening 32 enters into the bottom of the bore 27 to permit tool access to the slotted end of a set screw 33.

A cup-like cap 34 shaped as shown in FIGS. 7 and 8 securely closes the outer end of the enlarged extent 35 of the body cavity. Internally said cap is of tear drop shape, as at 36 to receive and restrict rotative movement of the side extension or fin 37 of a lock cylinder shell and plug assembly 38 (see FIGS. 9 and 10). The latter is provided with the usual key slot 39 accessible through an opening 40 therefor in the front of the cap 34 for the insertion of a suitable operating key 41. The turnable plug of the lock cylinder assembly 38 has a mutilated shouldered end portion 42 to engage a complementary shoulder 43 on the adjacent end portion of the turnable plug extension 29 to oscillate the plug in either direction within the limits permitted by a flat stop extension 44 on the other end of the plug extension and a complementary stop lug 45 (see FIG. 3) within the cavity portion 28.

The set screw 33 is shown in detail in FIGS. 5 and 6. The inner end thereof is formed with a hexagonal opening 46 to receive the inserted end of a wrench type tool 47 (see FIG. 3) and it also has a diametrical slot 48 for a screw driver 49 (see FIG. 4). The outer or work end of the set screw is in the form of a truncated cone, as at 50, to make impinging contact with a portion of the socket rim 21, as will hereinafter appear.

The improved trailer coupler cover lock is designed to prevent the unauthorized tow-away of a detached trailer. The hitch coupler socket 20 of the latter, for the stated purpose has applied to its open underside the improved cover plate lock assemblage 22. This is accomplished by relative sliding and vertical movements so as to engage the socket rim 21 under the plate flange 24 within the groove 25 so that the condition of FIG. 4 attains. Then, the proper key 41 is inserted into the slot 39 of the lock cylinder 38 and is turned clock-wise half a revolution. Through the engagement between the portion 42 of the lock cylinder and the shouldered end 43 of the plug extension, the latter will be similarly turned until limited by the stops 44 and 45. This will register the bore 30 in the plug extension with the boss cavity openings 31 and 32 whereby a tool 47 or 49 may be inserted, as shown in FIG. 4, and be engaged with the head end of the set screw 33. By turning the set screw in the proper direction, through the engagement of its beveled outer end portion 50 with the underside of the socket rim 21, the entire socket will be raised until its rim is securely clamped against the underside of the plate flange portion 24 whereby the cover plate is firmly locked to the socket to prevent the insertion into the trailer socket of the ball of an unauthorized towing vehicle. The tool 47 or 49 is next removed, and then the key 41 is given a half turn in the opposite direction, which removes the plug extension bore 30 from registry with the openings 31 and 32, preventing operating access to the set screw. Thus, the cover plate is effectively locked to the socket 20 and the key 41 may be removed from the lock.

The slightly modified form of the invention illustrated in FIGS. 13 and 14 contemplates a cover plate 22' wherein the groove 25 underlying the flange portion 24 is deeper or higher than in the principal form of the invention. Hence this form of trailer coupler cover lock may be used with a larger hitch coupler socket 20' or one with a denser or specially shaped rim 21'. Also, should the hitch coupler socket have a protruding rib 51 the latter may be accommodated by a clearance notch 52 formed in an adjacent portion of the cover plate flange 24, as is best shown in FIG. 14.

In FIG. 15 there is illustrated still another slight modification wherein the height or depth of the groove 25 below the flange portion 24 of the cover plate 22" is still greater for the accommodation of even larger sockets 20" including those whose rims have reverse bends 21" or are U-shaped.

An optional refinement is the inclusion in an enlargement of the plate boss outwardly opening bore 31 of a pair of washers 53 and 54 (see FIGS. 16 and 17) to prevent the entrance into the boss cavity 28 of dirt, water or other foreign matter. The washer 54 is a conventional steel washer while the washer 53 is formed of neoprene, rubber or other resilient material. It is also formed with slits 55 in the form of an X. Thus, with said washers 53 and 54 installed in the manner shown in FIGS. 1, 3, 4, 13 and 15 entrance to the boss cavity and the mechanism therein is blocked to preclude the undesirable admission of foreign matter, dirt, etc. However, when a wrench or tool is to be applied to the head end of the set screw 33 its shank can be inserted through the opening in the steel washer 54 and through the X slits 55 in the washer 53 with the material of the latter deflecting but resiliently engaging the tool to aid in retaining it in its operating, inserted position.

From the foregoing description it should be evident that an effective trailer coupled cover lock is provided which is applicable to various sized coupler sockets on many types of travel, camping, boat, appliance, horse and utliity trainers. The cover plate assembly being locked to the trailer coupler socket and of non-breakable steel, provides maximum protection against unauthorized tow-away. The cylinder lock mechanism non-removably housed within the plate boss is controlled by a key and gives maximum locking protection against the insertion of a tool for unauthorized operation of the securing set screw 33 which is completely housed and protected. The coupler cover plate with the incorporated lock mechanism is rap and shim proof and when properly engaged with a hitch coupler socket it is impossible to knock it off or unauthorizedly disengage it. Furthermore, the improved trailer coupler cover lock is free of manufacturing complications, is easy to apply and operate, is of strong and safe construction, and is well adapted for the intended purposes.

What is claimed as the invention is:

1. The combination with a trailer hitch coupler having a rimmed socket member for receiving an element of a towing vehicle, the improvements which comprise: a coupler lock assembly including a flanged cover plate removably applied to said socket member with the rim of the later engaging a flanged portion of the cover plate, said cover plate having an externally opening cavity therein, a set screw adjustably mounted within the cover plate to releasably, impingingly hold a rimmed portion of said socket member against a flanged portion of the cover plate, said set screw having a confined head end, and a lock body and associated extension turnably mounted in the cover plate cavity and having a controlled lock mechanism with actuating means accessible through the external opening of said cavity, the stock of the cover plate adjacent the cavity therein having communicating transverse bores alined with the head end of the set screw, one of said bores being externally opening and the lock body extension having a transverse bore which in one turned position of said extension registers with said cover plate transverse bores to permit the application of a tool through the last-mentioned bores and that of the lock body extension for engagement with the head end of the set screw to advance or retract it, another turned position of the lock body extension removing the bore therein from registry with the cover plate bores to render the set screw inaccessible.

2. The improvements recited in claim 1 wherein the flange on the cover plate is inwardly directed.

3. The improvements recited in claim 2 wherein the flange is horse-shoe shaped and provides between it and the plate body a groove of substantial depth.

4. The improvements recited in claim 1 wherein the lock body includes a pin tumbler cylinder.

5. The improvements recited in claim 1 wherein the lock mechanism is key actuated.

6. The improvements recited in claim 1 wherein the cover plate cavity is provided with a stop to limit the turning movement fo the lock body extension therein.

7. The improvement recited in claim 1 wherein that portion of the cover plate which has the externally opening bore is provided with a dirt guard.

8. The improvements recited in claim 7 wherein the dirt guard is formed to permit the entrance and retention of a tool.

9. A trailer coupler cover lock assembly for a trailer hitch including a socket for receiving an element of a towing vehicle, said lock assembly comprising relatively movable first and second parts, said first part being mounted in said second part for movement between advanced and retracted positions and said second part substantially enclosing said first part and having a cavity with wall openings through which external tool access to said first part is afforded upon certain turned movement of a lock plug extension hereinafter mentioned, a lock body and associated plug extension turnably positioned in the cavity and having a controlled lock mechanism with exposed actuating means, the plug extension having a transverse bore which, in one turned position of the plug extension, registers with the second part's cavity wall openings to permit the external application of a tool to said first part to advance or retract it and which in another turned position of the lock body and plug extension renders said first part inaccessible.

10. The trailer coupler cover lock assembly of claim 9 wherein the lock body includes a key actuated pin tumbler cylinder substantially filling the cross section of the cavity with an externally accessible key slot.

11. The trailer coupler cover lock assembly of claim 9 wherein said first relatively movable part is a set screw to releasably clampingly impinge a portion of the trailer hitch socket against a portion of said second relatively movable part.

12. The trailer coupler cover lock assembly of claim 11 wherein the set screw is threadably mounted in said second relatively movable part and is accessible for advancement or retraction only when the plug extension is in a predetermined turned position.

13. The trailer coupler cover lock assembly of claim 9 wherein the second relatively movable part is a cover plate for the trailer hitch socket and the lock mechanism is non-removably but turnably positioned in the cavity therein.

14. The trailer coupler cover lock assembly of claim 9 wherein the second part's cavity wall openings are transverse to the axis of said cavity.

15. The trailer coupler cover lock assembly of claim 9 wherein the plug extension is turned when the lock mechanism is turned by an external actuator applied thereto.

References Cited

UNITED STATES PATENTS

| | | | |
|---|---|---|---|
| 2,960,857 | 11/1960 | Winter | 70—19 |
| 3,237,969 | 3/1966 | Geresy | 280—507 |
| 3,391,555 | 7/1968 | Mamo | 70—258 |
| 3,410,580 | 11/1968 | Longenecker | 280—507 |

RICHARD E. MOORE, Primary Examiner

R. L. WOLFE, Assistant Examiner

U.S. Cl. X.R.

70—58; 280—507